United States Patent
Jungen et al.

(10) Patent No.: US 9,242,795 B2
(45) Date of Patent: Jan. 26, 2016

(54) STORAGE DEVICE HAVING PROTRUSION MONITORING

(75) Inventors: Karl-Heinz Jungen, Rheinzabern (DE);
Walter Burkart, Rheinstetten (DE)

(73) Assignee: KARDEX PRODUKTION DEUTSCHLAND GMBH (DE)

( * ) Notice: Subject to any disclaimer, the term of this patent is extended or adjusted under 35 U.S.C. 154(b) by 834 days.

(21) Appl. No.: 13/119,818

(22) PCT Filed: Sep. 14, 2009

(86) PCT No.: PCT/EP2009/006632
§ 371 (c)(1),
(2), (4) Date: Aug. 5, 2011

(87) PCT Pub. No.: WO2010/031525
PCT Pub. Date: Mar. 25, 2010

(65) Prior Publication Data
US 2012/0130527 A1    May 24, 2012

(30) Foreign Application Priority Data
Sep. 22, 2008  (DE) .......................... 10 2008 048 367

(51) Int. Cl.
  B65G 1/00  (2006.01)
  B65G 1/04  (2006.01)
(52) U.S. Cl.
  CPC ............... *B65G 1/0407* (2013.01); *B65G 1/00* (2013.01); *B65G 2207/40* (2013.01)
(58) Field of Classification Search
  USPC ....................................................... 700/112
  See application file for complete search history.

(56) References Cited

U.S. PATENT DOCUMENTS

| 2004/0094495 A1* | 5/2004 | Bouche ................... 211/187 |
| 2009/0095696 A1* | 4/2009 | Lang et al. .............. 211/153 |
| 2009/0244551 A1* | 10/2009 | Lutz ...................... 356/630 |

FOREIGN PATENT DOCUMENTS

| DE | 4233688 A1 | 4/1994 |
| DE | 19501718 A1 | 7/1996 |

(Continued)

OTHER PUBLICATIONS

Machine Translation of JP 06-040508 (Feb. 15, 1994).*

(Continued)

*Primary Examiner* — Ryan Jarrett
(74) *Attorney, Agent, or Firm* — Edell, Shapiro & Finnan, LLC

(57) ABSTRACT

The invention relates to a storage device (1) for storing storage goods (25) in storage spaces (8), comprising at least one storage good carrier (7) which can be supplied with storage goods (25) and which is associated with a stowage space volume (S) that can be occupied by the storage goods (25) at a maximum. The storage device (1) comprises a control station (10), on which the stowage space volume (S) of the at least one storage good carrier (7) can be arranged accessible from outside of the storage device (1). The storage device (1) is equipped with a conveyer unit (5, 6), by which the storage goods carrier (7) can be moved from the control station (10) to the storage spaces (8). In order to reduce the danger to people, the storage device (1) and storage goods (25) posed by too large or incorrectly positioned storage goods (25) on the storage good carrier (7), a protrusion measuring unit for determining a horizontal protrusion (U1) of the storage goods beyond the stowage space volume (S) is provided according to the invention.

12 Claims, 5 Drawing Sheets

(56) References Cited

FOREIGN PATENT DOCUMENTS

| DE | 10115757 A1 | 10/2002 |
|---|---|---|
| DE | 10115765 A1 | 10/2002 |
| DE | 102005038019 A1 | 2/2007 |
| EP | 1038804 A1 | 9/2000 |
| JP | 56145016 A | 11/1981 |
| JP | 60015302 A | 1/1985 |
| JP | 06040508 A | 2/1994 |
| JP | 11301811 A | 11/1999 |

OTHER PUBLICATIONS

International Preliminary Report on Patentability for PCT/EP2009/006632, dated Dec. 19, 2010, 5 pages.
International Search Report for PCT/EP2009/006632, dated Feb. 9, 2010, 6 pages.
International Preliminary Report on Patentability for International Application No. PCT/EP2009/006632, 5 pages (English translation), Dec. 29, 2010.
German Search Report for German Application No. 10 2008 048 367.2, dated Mar. 18, 2009, 3 pages.
European Office Action corresponding to Application No. 09 778 507.5, dated May 20, 2014 (Paragraphs 3-5 translated into English).
"Sensoren optimieren automatisierte Prozesse im Logistik-Bereich", Mar. 1, 2007, XP055117721, Gefunden im Internet: URL:http://www.cedes.com/documents/media/2007/logistik.pdf [gefunden am May 13, 2014], published Sep. 21, 2006.
Safety Controller, Alternative to Complex Safety PLC, SPS-Magazin, http://www.sps-magazin.ch/?inc=artikel/articleshow&nr=31649, published Sep. 21, 2006, 2 pages (English Translation).

* cited by examiner

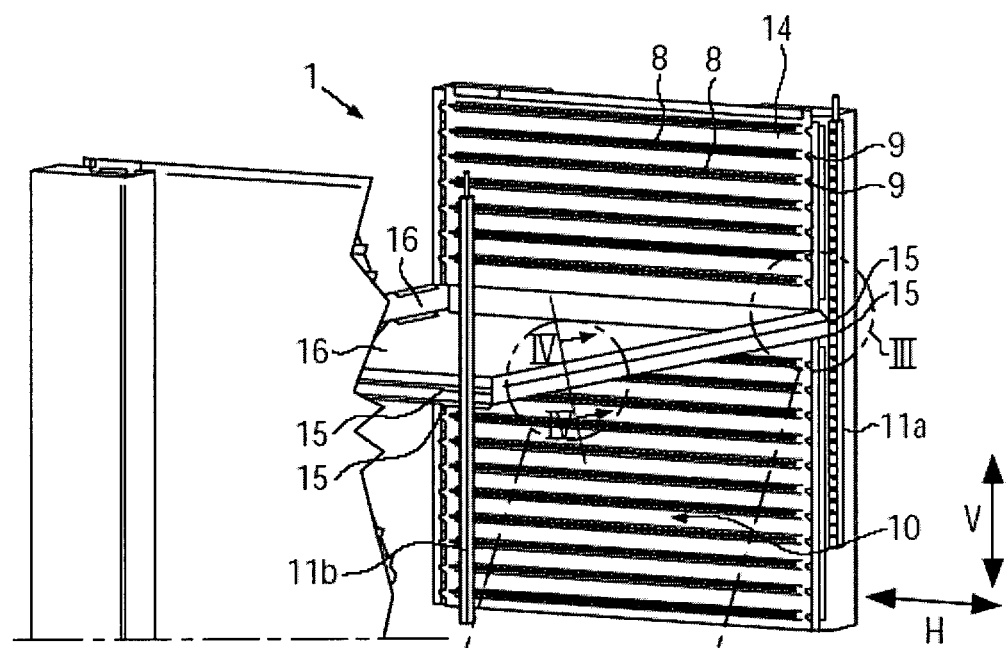
FIG. 3
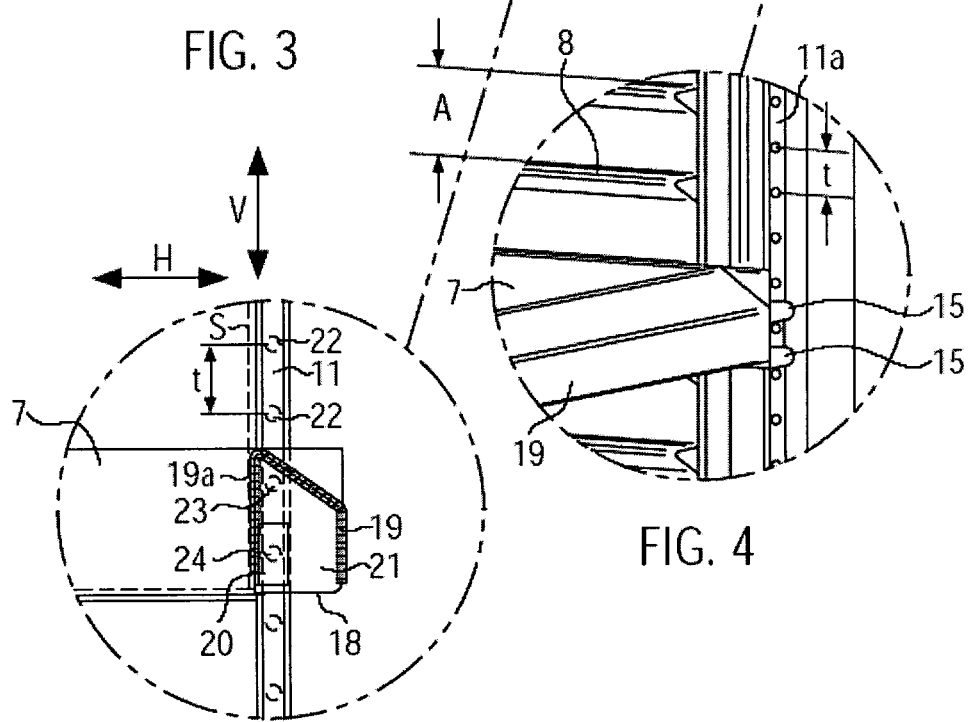
FIG. 4
FIG. 5

STORAGE DEVICE HAVING PROTRUSION MONITORING

The invention relates to a storage device for storing storage goods in storage spaces, comprising at least one storage goods carrier which can be supplied with storage goods and which is associated with a stowage space volume that can be occupied by the storage goods at a maximum, comprising a control station, on which the stowage space volume of the at least one storage goods carrier can be arranged accessible from outside of the storage device, comprising a conveyor unit, by which the storage goods carrier can be moved from the control station to the storage spaces, a control unit for automatically controlling the conveyor unit and comprising at least one protrusion measuring unit for determining a horizontal protrusion of the storage goods beyond the stowage space volume.

Furthermore, the invention relates to a method in which storage goods are arranged in the stowage space volume of storage goods carriers from outside a storage device at a control station of the storage device and are automatically deposited in several storage spaces of the storage device arranged one upon the other or next to the other, and in which it is automatically detected, while the storage goods are being deposited, whether the storage goods project beyond the stowage space volume that can be occupied by the storage goods at a maximum, protrusion measuring taking place in the region of the control station.

Storage devices in the form of storage racks and storage lifts with conveyor units and storage goods carriers of the type mentioned above and methods for depositing storage goods carriers in these storage devices and withdrawing them from the latter are known. For better utilizing storage areas, often a plurality of storage spaces is arranged one upon and next to the other in the storage devices, on which storage goods carriers carrying storage goods can be deposited. In the process, the storage goods carriers are, for example, positioned by an operator in a control station which can be designed, for example, as loading and/or withdrawal opening. In the control station, the storage goods carriers are moved by a pick-up member or a transfer device, respectively, to a conveyor unit which can bring the storage goods carriers to a storage space intended for them. This storage space can be selected, for example, by the operator or determined by electronic control of the storage device. The selection of the storage space can be, for example, based on available data about the storage goods carrier and the goods stored thereon. If the deposited storage goods carrier is to be withdrawn, it is transported by the conveyor unit from its storage space back to the control station where it can be withdrawn from the storage device.

A storage device or a storage lift with a conveyor unit embodied as a vertical conveyor is known, for example, from DE 1 01 15 765 A 1. Here, the conveyor unit withdraws a storage goods carrier embodied as a panel from a transfer position from a control station which is embodied as an opening of a storage rack and subsequently transports the storage goods carrier to the storage space intended for it. The storage device has a plurality of storage spaces located one upon the other which are each formed by supporting profiles.

In DE 42 33 688 A1 and DE 195 01 718 A1, storage lifts are described in which the height of the storage goods arranged on the storage goods carriers is measured by means of a light grille. On the basis of height measurement, the respective storage goods carriers are deposited at storage spaces coming as close as possible to the height of the storage goods with the aim of optimally utilizing the stowage space available in the storage rack.

The storage lift shown in DE 1 01 15 757 A 1 has a control station equipped with a light grille for detecting the height of the storage goods. To be able to determine a certain position of a storage goods carrier in the loading and withdrawal opening by means of the light grille, the storage goods carrier is provided with a screen which a light beam of the light grille can pass.

It is a disadvantage of the above mentioned storage devices that the deposition of too large storage goods or storage goods not correctly positioned on the storage goods carrier can lead to damages at the storage device and/or at the deposited storage goods and to a risk for operators. This problem is aggravated by the usually very dense construction of storage devices with the aim of optimal space utilization.

Consequently, it is an object of the invention to improve the storage devices and respective methods mentioned in the beginning such that the endangerment of persons, the storage device and the storage goods emanating from too large storage goods or storage goods incorrectly positioned on the storage goods carrier is reduced.

This object is achieved for the device mentioned in the beginning by the storage device being provided with a control unit for automatically controlling the conveyor unit, and by the at least one storage goods carrier comprising at least one triggering element by means of which in at least one predetermined position of the storage goods carrier in the region of the control station, a signal can be triggered to the control unit for starting protrusion measurement.

The stowage space volume that can be occupied by a storage goods carrier at a maximum corresponds to a volume associated with a storage goods carrier which can be occupied by the storage goods without there being a risk of a collision of the storage goods during transport with other parts of the storage device or deposited storage goods, of an overloading of the storage goods carrier or of storage goods falling down. By a protrusion measuring unit, a protrusion of the storage goods beyond the stowage space volume that is associated with a storage goods carrier and can be occupied at a maximum can be completely avoided. The solution according to the invention moreover permits to relate the measurement of the protrusion and/or the height of the storage goods with the position of the storage goods carrier.

This solution according to the invention can be combined as desired with the following further embodiments which are each advantageous alone and further improved:

According to a first possible advantageous embodiment of the storage device according to the invention, the storage device can comprise a height measuring unit for measuring the height of the stowage space volume occupied by the storage goods, where the protrusion measuring g unit is formed by the height measuring unit. The protruding sections of the storage goods also have a certain height which can be measured by height measurement, for example starting from a floor area of the storage goods carrier. In particular if the position of the storage goods carrier is known, a measurable height which is outside the limits of the maximal stowage space volume of the storage goods carrier gives information about a protrusion.

For a contactless and wear-free measurement of the protrusion or the height of the storage goods, the protrusion measuring unit and/or the height measuring unit can comprise sensors which function on an optical, capacitive and/or magnetic basis.

In a further advantageous embodiment, the storage device can be provided with a control unit for automatically controlling the conveyor unit, for example to relate the result of height measurement or protrusion measurement directly to the selection of a storage space suited for the storage goods. A small protrusion of the storage goods can be permitted within predetermined limits, so that the selection of a suited storage space is connected with the measurement of a small protrusion which offers space for the protrusion.

In the sense of a design of the storage goods carrier that is as simple as possible, the triggering element can be arranged in the region of an outer edge of the storage goods carrier. The triggering element can be formed by a section of the outer edge of the storage goods carrier arranged transverse to the direction of motion of the storage goods carrier and facing to the direction of motion of the storage goods carrier. In this manner, the triggering element does not require any additional constructive efforts. The triggering element can, for example, touch a push button and actuate the same when it reaches the predetermined position of the storage goods carrier. As an alternative, the entering or exiting of the outer edge of the storage goods carrier forming the triggering element into or out of the light grille can activate protrusion measurement.

According to another possible advantageous embodiment of the storage device according to the invention, the protrusion measuring unit can comprise at least one light grille. Light grilles offer the possibility of a simple and wear-free measurement of the protrusion. A light grille can moreover be simultaneously used for measuring the height of the storage goods as well as for measuring the protrusion, whereby the constructive efforts and thus the costs of the storage lift can be reduced. Already one single light grille can be sufficient to determine the protrusion of the storage goods on at least two sides of the storage goods carrier. Thus, a first protrusion measurement can be triggered when an outer edge facing to the direction of motion of the storage goods carrier passes the light grille, and a second protrusion measurement can be triggered when the storage goods carrier exits again from the light grille, that means, a second outer edge extending parallel to the first one passes the light grille.

The triggering element can be formed by at least one screen covering a light beam. A screen can be arranged at any arbitrary site of the storage goods carrier and permits to determine the position of the storage goods carrier by the light grille, even if it dos not flush with one of the outer edges of the storage goods carrier. Moreover, a screen offers at least two reference edges for at least one light beam, so that the position of the storage goods carrier is clearly determined with only two beams of the light grille.

After protrusion measurement has been triggered, the control unit can require a certain time to detect the protrusion of the storage goods. If the protrusion of the storage goods is measured, for example, during horizontal transport of the storage goods carrier, it can therefore be advantageous not to arrange the triggering element directly in the region of an outer edge of the storage goods carrier, but in a region whose distance corresponds to the distance the storage goods carrier has covered in the time from the triggering of the protrusion measurement to the detection of the protrusion. In this manner, even a protrusion projecting only slightly from the outer edge of the storage goods carrier can be detected at least in one direction of motion of the storage goods carrier, despite a possible delay of protrusion measurement.

To be able to measure the protrusion of the storage goods already during or shortly after loading of the storage goods, according to a further advantageous embodiment, the arrangement of the protrusion measuring unit in the region of the control station is provided. The protrusion measuring unit can be arranged, for example, at the end of the control station facing the conveyor unit, so that the protrusion can be measured already while the storage goods carrier is loaded, or before the control station is left.

To terminate protrusion measurement carried out during the transport of the storage goods carrier within the control station, the control station can have a certain minimum length. In this manner, it is ensured that the storage goods carrier is still located within the control station if transport is interrupted as a consequence of a protrusion.

The protrusion measuring unit can be arranged at the end of the control station facing the conveyor unit. Such an arrangement permits the measurement of the protrusion while the storage goods carrier leaves the control station. For example, a light grille arranged at the end of the control station facing the conveyor unit can measure first the protrusion facing to the direction of the conveyor unit, and after horizontal translation of the storage goods carrier by a length of the storage goods carrier, the protrusion facing to the direction of the control opening.

As an alternative or in addition, a protrusion measuring unit can be provided at the control opening at the end of the control station facing away from the conveyor unit. Such an arrangement of the protrusion measuring unit permits a measurement of the protrusion facing in the direction of the control opening, while the storage goods carrier is located in the control station. For example, the protrusion can be already determined in a loading position of the storage goods carrier during loading, so that an operator can correct the position of the storage goods on the storage goods carrier already before a depositing operation is started. If the protrusion measuring unit is designed as light grille in the region of the control opening, it can be also used as safety means which stops the conveyor unit of the storage device when the light beam is interrupted, for example by the hand of an operator.

To detect the protrusion of the storage goods already during loading of the storage goods carrier, the protrusion measuring unit can be arranged in the region of an edge of a storage goods carrier located in the control station in a loading position. The limits of the stowage space volume associated with the storage goods carrier that can be occupied at maximum can flush with edges of the storage goods carrier which are arranged at the ends of the inner or outer surfaces of the side walls limiting the stowage space of the storage goods carrier.

According to a further advantageous embodiment of the storage device, the maximal stowage space volume of a storage goods carrier can be adjusted to the nature of the storage goods. For example, with storage goods of high density, a smaller maximal stowage space volume can be associated with the storage goods carrier to avoid overloading of the storage goods carrier.

The storage goods carrier of the storage device can comprise screens arranged one next to the other in a longitudinal direction, in particular in the horizontal conveying direction. By at least two to three screens being arranged one next to the other, several positions of the storage goods carrier can be clearly determined by means of at least two to three light grilles. For example, in case of three light grilles arranged one behind the other in the longitudinal direction of the storage goods carrier, two covered light beams of the first two light grilles as well as one light beam of the third light grille that is not interrupted due to a screen in the storage goods carrier can indicate the loading position of the storage goods carrier. In case of a translation of the storage goods carrier by for example 50 mm in the direction of the conveyor unit, an interrupted light beam of the first and the third light grille and a non-interrupted light beam of the second light grille can indicate this position which is then taken into consideration for the determination of a possible minimal length of a possible protrusion.

For the method mentioned in the beginning, the object is achieved by a triggering element at the storage goods carrier emitting a signal to the control unit of the storage device which triggers protrusion measurement when the storage goods carrier reaches and/or leaves a loading position. When the protrusion measuring unit is correspondingly arranged at the end of the storage goods carrier facing to and/or away from the conveyor unit, this permits to measure the protrusion already during loading.

The method according to the invention can be combined as desired with the following further procedure steps which are each advantageous alone and further improved:

For example, in a loading position of the storage goods carrier, a triggering element can emit a signal to the control unit of the storage device which triggers a protrusion measurement. With a corresponding arrangement of the protrusion measuring unit at the end of the storage goods carrier facing away from and/or to the conveyor unit, this permits measurement of the protrusion already during loading.

As an alternative, at the beginning of a transport of the storage goods carrier to the storage space, the triggering element can emit a signal to the control unit of the storage device which triggers protrusion measurement. If, for example, only one protrusion measuring unit is arranged at the end of the control station facing the conveyor unit, the protrusion can be determined on two sides of the storage goods carrier while the latter passes through the protrusion measuring unit. By determining the protrusion during the transport of the storage goods carrier, the length of the protrusion in the direction of transport can be determined when the transport speed is known. The storage goods can be passed by the immobile measuring elements until they have detected the respective other end of the storage goods. Measurement of the protrusion during the transport to the storage space additionally offers the advantage of saving time.

To ensure secure operation of the storage device, the protrusion measuring unit can emit a signal to the control unit when the storage goods project from the stowage space volume associated with the storage goods carrier, as a consequence of which the control unit actuates a signal means. As an alternative or in addition, the control unit can, as a result of a signal of the protrusion measuring device indicating a protrusion, emit a motor control signal to the conveyor unit as a result of which the conveyor unit stops.

For a simple, inexpensive construction of the protrusion measuring unit, as a trigger light beam, the control unit can associate a light beam of a light grille serving as protrusion measuring unit with a storage goods carrier arranged in the control station, where, when it is admitted or stopped down by a screen of the storage goods carrier, protrusion measurement is triggered. In this manner, a light grille can be simultaneously used for triggering protrusion measurement for the protrusion measurement itself as well as for the height measurement of the storage goods. As an alternative or in addition, a signal can also be emitted to the control unit when the contour of the storage goods carrier enters the light grille or exits from it, while the signal then triggers protrusion measurement.

Below, the invention will be illustrated by way of example by means of advantageous embodiments with reference to the drawings. The described embodiments here only represent possible embodiments, where, however, the individual features, as is described above, can be realized independently of one another and can be omitted.

In the drawings:

FIG. 3 shows a schematic perspective view of a grid wall of a control station of the storage device according to the invention with a light grille and a storage goods carrier;

FIG. 4 shows an enlarged partial view of the detail III of the schematic perspective view of the grid wall of FIG. 3;

FIG. 5 shows an enlarged side view of the light grille of FIG. 3 along the cutting line IV-IV;

First, a storage device 1 according to the invention is described with reference to FIGS. 1 and 2 which show a storage device 1 according to the invention with partially removed side walls.

Figure 1:
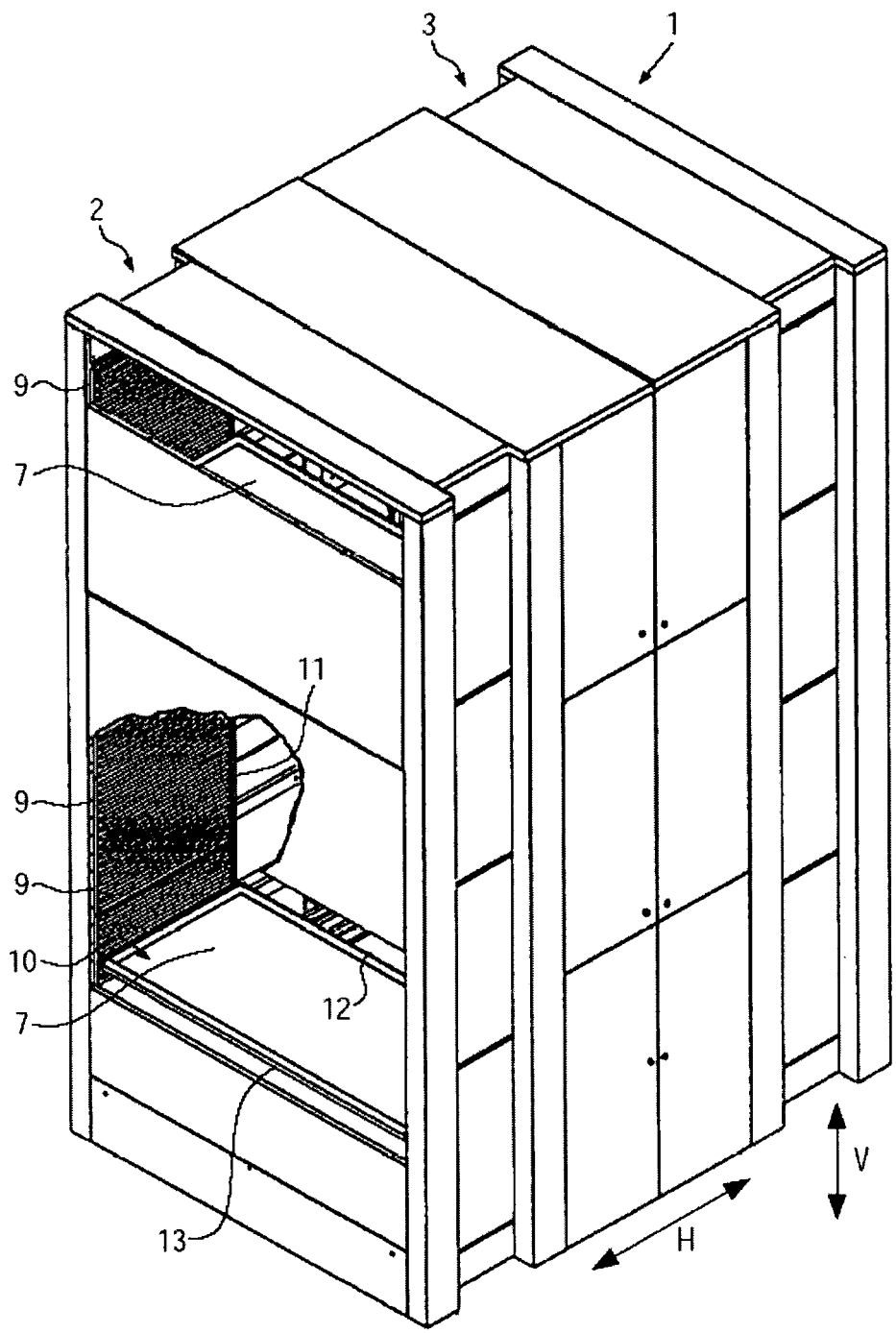
FIG. 1 shows a schematic perspective view of a first embodiment of a storage device according to the invention.
Figure 2:
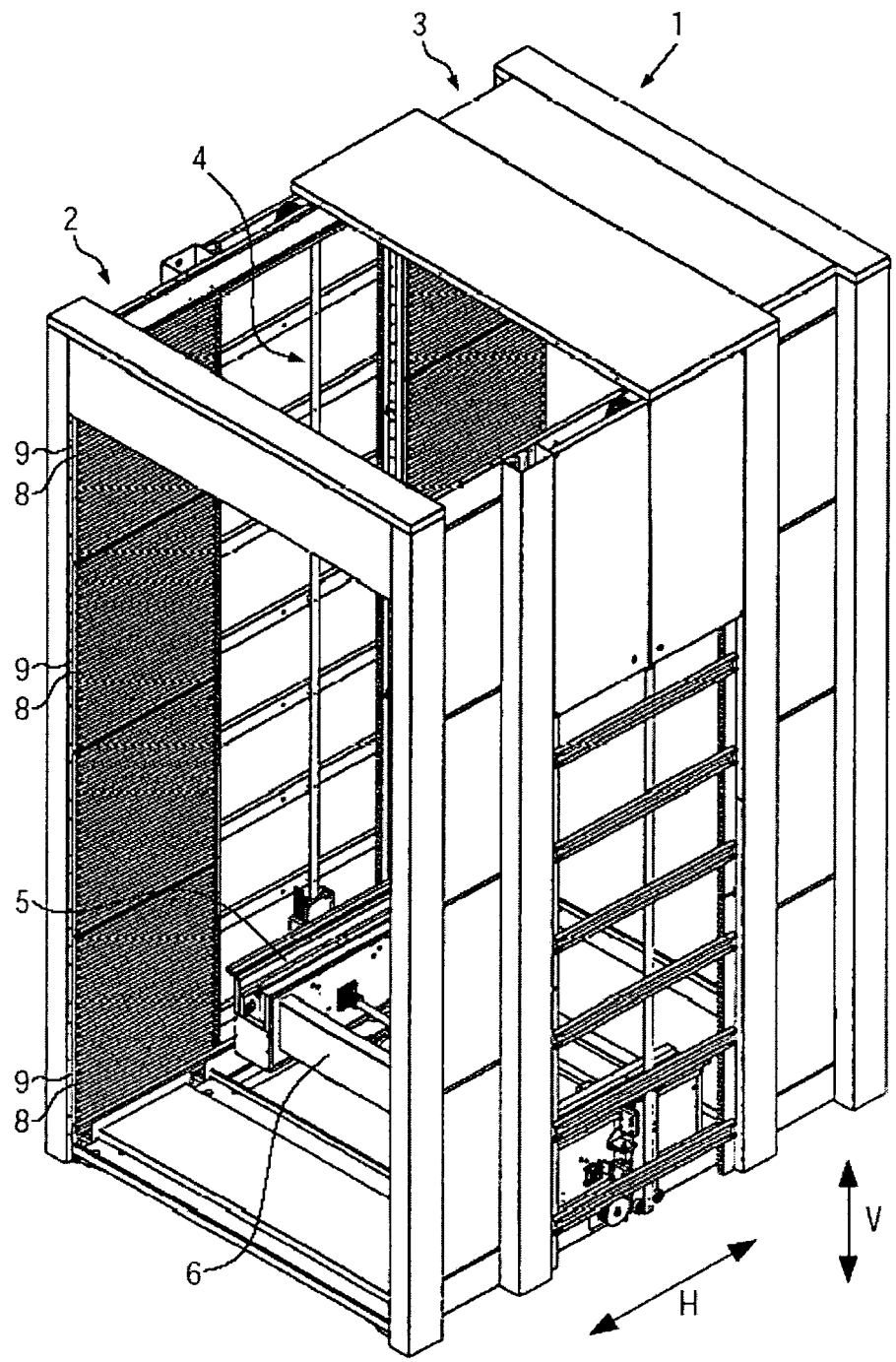
FIG. 2 shows a further schematic perspective view of the first embodiment of a storage device according to the invention.

The embodiment of a storage device 1 according to the invention shown in FIGS. 1 and 2 in the form of a storage lift 1 has two rack columns 2, 3 which define a conveyor shaft 4. In the shaft 4, a conveyor unit 5, 6 equipped with a horizontal conveyor 5 and a vertical conveyor 6 can be moved up and down to transfer storage goods carriers 7 to different storage spaces 8 of the rack columns 2 and 3, respectively. The individual storage spaces 8 are formed by supporting profiles 9 arranged in pairs one upon the other and at a distance to each other, the supporting profiles being used to support supporting webs at the opposed sides of the storage goods carriers 7. The storage lift 1 is provided with a control station 10 into which an operator can introduce storage goods carriers. In the storage lift 1 shown in FIG. 1 and FIG. 2, supporting profiles 9 are also provided in the control station 10 which permit to introduce storage goods carriers 7 at different heights of levels Y of the control station 10. Consequently, an operator has the possibility of simultaneously pushing several storage goods carriers 7 into the control station.

In the region of the side of the control station 10 facing the conveyor unit 5, 6, a light grille 11 is arranged which can be utilized for measuring the height of the storage goods located on the storage goods carriers 7 and can moreover be used for identifying and verifying the position of the respective storage goods carrier 7 introduced into the control station 10, where its vertical position as well as its horizontal position is detected. Moreover, the light grille 11 is used to determine the protrusion of storage goods located on the storage goods carrier in the direction of the conveyor unit 5, 6.

By the protrusion being measured during horizontal transport of the storage goods carrier in a horizontal direction H, with the light grille 11, the protrusion of the storage goods on the sides of the storage goods carrier 7 facing to and away from the conveyor unit 5, 6 can be detected. In the loading position of the storage goods carrier 7 shown in FIG. 1, the outer edge 12 of the storage goods carrier 7 flushes with the light beams of the light grille 11, so that a protrusion of the storage goods beyond the edge 12 of the storage goods carrier 7 can be detected already in the loading position. If, however, the storage goods protrude beyond the edge 13 of the storage goods carrier 7, this is already detected during transport of the storage goods carrier 7 in the horizontal direction H on the conveyor unit 5, 6. After the edge 13 of the storage goods carrier 7 has passed the light grille 11 in the direction of the conveyor unit 6, 7, individual light beams of the light grille 11 are still interrupted or stopped down due to the protruding portion of the storage goods, whereby the control unit of the storage lift 1 not represented here detects a protrusion and stops the conveyor unit 5, 6.

As an alternative or in addition, a protrusion measuring unit 11 can be provided at the control opening at the end of the control station 10 facing away from the conveyor unit 5, 6. Such an arrangement of the protrusion measuring unit 11 permits measurement of the protrusion facing in the direction of the control opening while the storage goods carrier is in the control station. For example, the protrusion in the loading position of the storage goods carrier 7 shown in FIG. 1 can be already determined during loading. If the protrusion measuring unit 11 is designed as light grille in the region of the control opening, it can be also used as safety means which stops the conveyor unit 5, 6 of the storage device 1 when the light beam is interrupted, for example by the hand of an operator.

As an alternative, a storage lift 1 can also be designed as a circulating rack in which the storage goods carriers 7 are circulated horizontally and/or vertically to a control station.

In FIG. 3, a perspective partial view of the control station of the storage lift 1 according to FIG. 1 is shown seen from the inner side of the storage lift. The side walls 14 of the control station 10 are provided with supporting profiles 9 arranged one upon the other in pairs and forming a plurality of individual storage levels 8 or storage spaces 8. The supporting profiles 9 serve to support supporting webs 15 at the opposed side walls 16 of the storage goods carrier 7.

In the region of the control station 10, a light grille 11a, 11b is arranged which can be used for measuring the position of the storage goods carrier 7 as well as the height and the protrusion of storage goods located on the storage goods carrier. The position of the storage goods carrier 7 introduced into the control station 10 is detected in the horizontal direction H as well as in the vertical direction V.

Further operating modes of the storage device shown in FIGS. 1 and 2 will be explained below with reference to FIGS. 4 and 5, in which an enlarged view of the detail III of FIG. 3 as well as an enlarged sectional view along line IV-IV of FIG. 3 are shown.

The determination of the position of the storage goods carrier 7 is effected via screens 18. In the represented, particularly advantageous embodiment, the screens 18 are arranged in the region of opposed ends of the storage goods carrier 7 embodied as grip bars 19. One screen 18 each is formed by a side wall 21 of the grip bar 19 provided with a window 20. The dimensions of the side wall 21 and of the window 20 are in this case adapted to a spacing t of the light barriers 22 or measuring elements 22 of the light grille 11a, such that one light beam each passes the screen 18 and an adjacent light beam is interrupted, i.e. stopped down by the screen 18. While the interrupted light beam 23 of the control unit (not shown) communicates that a storage goods carrier 7 is located in the region of the control station 10, the continuous light beam 24 serves to confirm the position of the storage goods carrier 7, in this case the loading position of the storage goods carrier 7.

The maximum stowage space volume S of the storage goods carrier 7, whose limits are represented here in a dashed line, is limited in the horizontal direction H by the surface 19a of the grip bar 19 facing inwards. In the vertical direction V, the stowage space volume S is limited above the grip bar 19.

If storage goods project beyond the horizontal limit, i.e. beyond the surface 19a of the grip bar 19 facing inwards, light barriers 22 of the light grille 11 are interrupted. This leads to a signal to the control unit which blocks or stops the transport of the storage goods carrier 7.

As an alternative or in addition, an alarm signal can be emitted which informs the operator about an existing protrusion.

The spacing t of the light grille 11a, 11b corresponds to half a distance A between the supporting profiles 9 each arranged one upon the other in the vertical direction V, so that in an arrangement of the storage goods carrier 7 at any arbitrary storage space 8, a light beam is always transmitted through the window 20, while an adjacent light beam situated thereabove is interrupted by the screen 18. For an exacter measurement of the protrusion, which also detects protruding objects having a width <½A, the spacing of the light grille 11a, 11b can be reduced.

Figure 6:
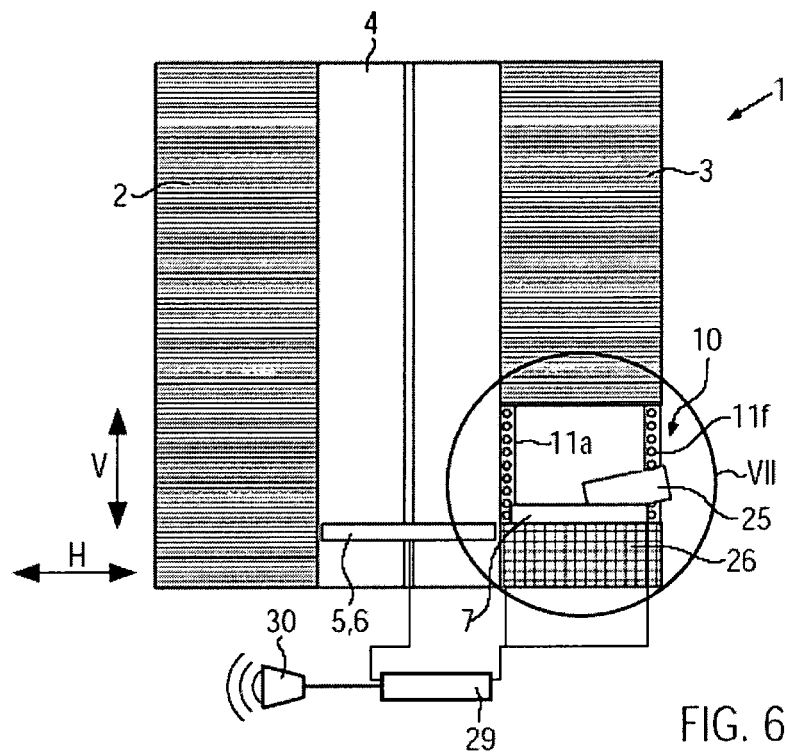
FIG. 6 shows a schematic cross-sectional view of a second embodiment of a storage device according to the invention and its control station.

In FIG. 6, a further embodiment of the storage device 1 according to the invention is shown in a schematic cross-sectional view in the form of a storage lift 1. For the sake of simplicity, below only the differences to the embodiments of a storage device 1 shown in FIGS. 1 and 2 will be discussed, where the same elements are provided with the same reference numerals.

The storage device 1 is provided with two rack columns 2, 3 which are arranged on both sides of a conveyor shaft 4. In the conveyor shaft 4, a conveyor unit 5, 6 is arranged which can comprise, apart from a vertical conveyor 6, a horizontal conveyor 5. Furthermore, the storage device 1 has a control station 10 at which an operator can deposit or withdraw storage goods 25 into the storage device 1 or from the same.

The storage device 1 comprises a control unit 29 which is connected with the light grilles 11a, 11f of the conveyor unit 5, 6 and a signal unit 30. The control unit 29 selects a suited storage space 8 and stops the conveyor unit 5, 6, if a protrusion of the storage goods 25 is detected. In addition, the control unit 29 emits a signal to a signal unit 30 in case of a protrusion which, as a result, emits an acoustic warning signal. The control unit 29 can moreover comprise a control panel or be connected to a control panel which permits active control of the storage device 1 by the operator or a change of control parameters, for example the stowage space volume that can be occupied at a maximum.

At both sides of the control station 10, light grilles 11a, 11f are arranged by means of which the position of the storage goods carrier 7 as well as the height and the protrusion of the storage goods 25 can be determined. The light grille 11f facing the operator can moreover serve as safety means 11f which detects whether an operator or objects are located in the control station or project into the control station. In this case, a conveying operation, in particular horizontal conveyance, into or out of the control station, as in case of a protrusion of the storage goods 25, is interrupted for safety reasons. By means of the light grille 11a, a protrusion of the storage goods in the direction of the conveyor unit 5, 6 can be determined in the shown loading position of the storage goods carrier 7.

The loading position of the storage goods carrier 7 is reached in the storage device shown in FIG. 6 when the storage goods carrier 7 does not interrupt any light beams of the light grilles 11a, 11f as shown in FIG. 6. To confirm that a storage goods carrier 7 is actually located on the platform 26 of the control station 10, a light barrier can be arranged in the region of the storage goods carrier 7 located in the loading position which is interrupted, for example, by the side walls of the storage goods carrier 7. As an alternative, a push-button can be arranged under the storage goods carrier which emits a corresponding signal to the control unit of the storage device when a storage goods carrier 7 rests on it.

Furthermore, a weighing means can be integrated in the platform 26, which determines the weight of the storage goods carrier 7 with the storage goods 25 located on it, so that not only the presence of a storage goods carrier 7 is detected, but also the weight of the storage goods 25 is determined. The determined weight of the storage goods 25 can be evaluated in the control unit to determine a suited storage space for the storage goods 25 in the sense of optimal weight distribution in the storage device 1.

Figure 7:
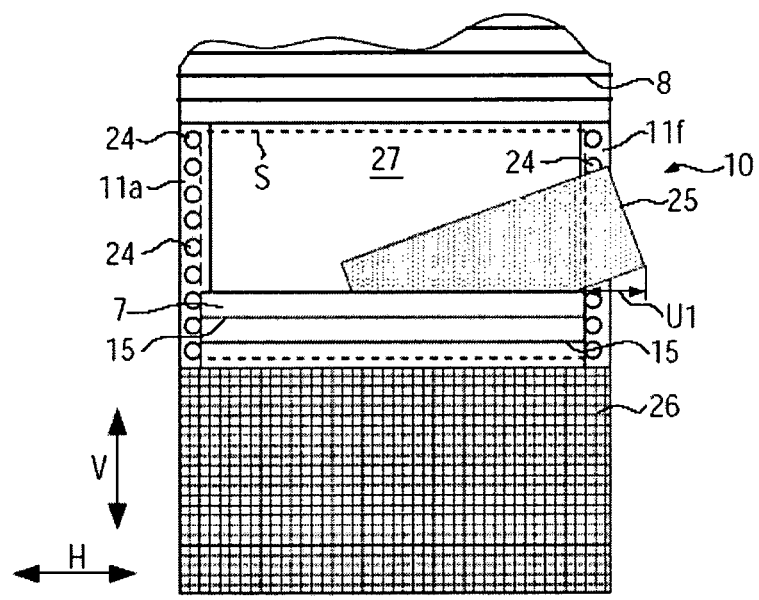
FIG. 7 shows an enlarged partial view of the detail VI of the schematic cross-sectional view of FIG. 6.

In FIG. 7, an enlarged partial view of the detail VII of FIG. 6 is shown. A stowage space volume S that can be occupied by the storage goods 25 at a maximum is associated with the storage goods carrier 7, beyond which volume the storage goods 25 must not project in the sense of secure loading of the storage goods carrier 7. While a lateral protrusion of the storage goods 25 in a direction transverse to the horizontal direction H can be avoided by side walls 27 limiting the stowage space volume S, a horizontal protrusion is determined in the direction H by the light grilles 11a, 11f. The storage goods 25 cover four of the nine light beams of the light grille 11f. The light grille 11f serving as protrusion measuring unit 11f emits a signal to the control unit of the storage lift 1 on the basis of the interrupted light beams, whereupon the control unit prevents a transport of the storage goods carrier 7 by the conveyor unit 5, 6.

Correspondingly, a protrusion of the storage goods 25 on the side of the control station 10 facing the conveyor unit 5, 6 can be determined by the light grille 11a which also serves as protrusion measuring unit 11a. In the shown loading position of the storage goods carrier 7, it can only be determined whether there is a protrusion of the storage goods 25. The length of the protrusion U1 can be determined by measuring the duration of the interruption of the light beams of the light grille 11a or 11f, respectively, during the transport of the storage goods carrier 7 in the horizontal direction H. With a known, predetermined conveying speed of the horizontal conveyor 5, one can thereby calculate the length of the protrusion U1. The determination of the length of the protrusion U1 is in particular advantageous if a certain maximal protrusion U1 is to be tolerated at least temporarily.

Figure 8:
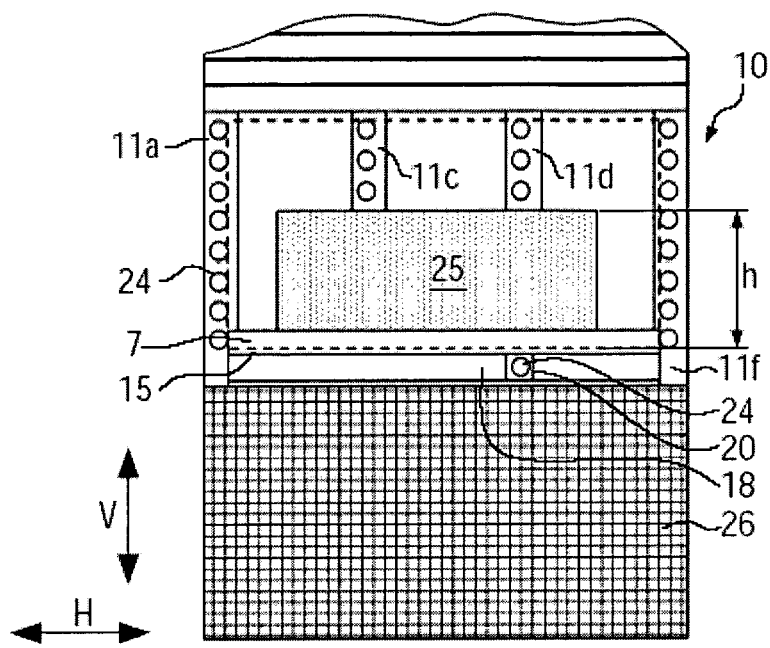
FIG. 8 shows an enlarged partial view of a third embodiment of the storage device according to the invention.

In FIG. 8, a detail of a further possible embodiment of a storage device 1 according to the invention is shown in a schematic cross-sectional view. For the sake of simplicity, below only the differences to the embodiments of a storage device 1 shown in FIGS. 6 and 7 will be discussed, where the same elements are provided with the same reference numerals.

The control station 10 comprises two further light grilles 11c, 11d which permit a more precise determination of the position of the storage goods carrier 7. A section 18 of the side wall of the storage goods carrier 7 forms a screen 18 with a window 20 which transmits a light beam of the light grille 11c before the loading position is reached, and when the shown loading position is reached, forms a passage for a light beam 24 of the light grille 11d. The additional light grilles 11c, 11d moreover permit a more differentiated measurement of the height of the storage goods 25 already during loading in the control station as variations of the contour of the storage goods 25 are detected at the height of the light grille 11c, 11d.

Figure 9:
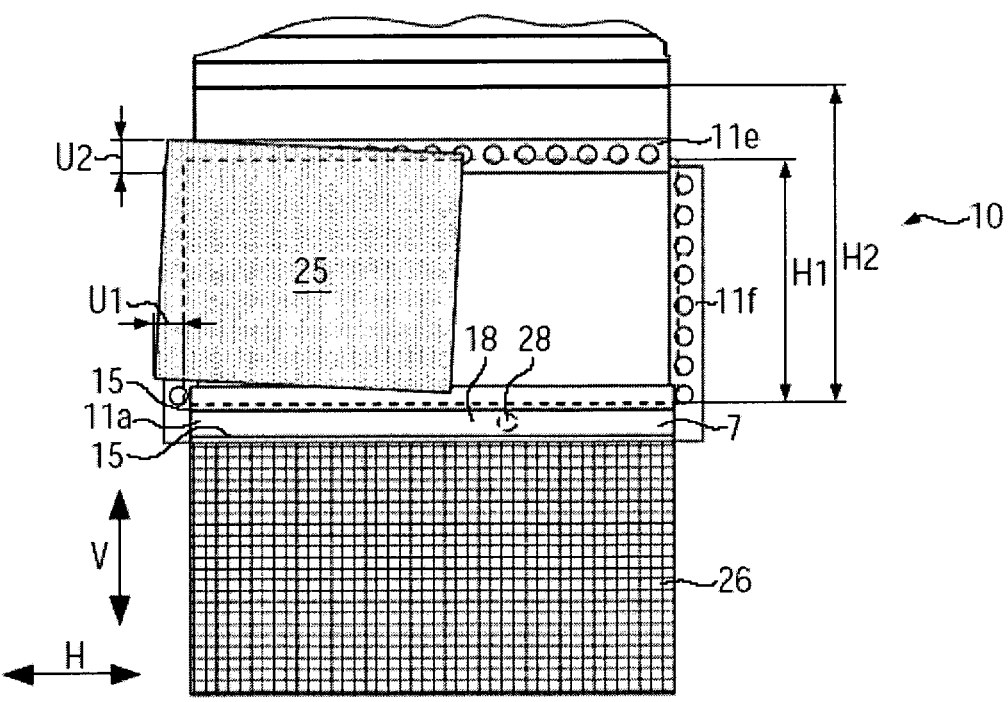
FIG. 9 shows a schematic partial view of a fourth embodiment of a storage device according to the invention.

FIG. 9 shows a fourth embodiment of the storage device according to the invention, where for elements which correspond to the previous embodiments as concerns their function and design, the same reference numerals are used. To keep the description short, the differences to the embodiments of the figures described above are discussed.

The control opening of the control station 10 has, for example for ergonomic reasons, a height H2 which, starting from the lower limit of the stowage space volume S of the storage goods carrier 7 that can be occupied at a maximum, is higher than the height H1 of the stowage space volume that can be occupied at a maximum. To prevent a protrusion of the storage goods 25 in the vertical direction V despite a missing limit of the height by the height of the opening of the control station 10, a further light grille 11e arranged horizontally is provided which detects a protrusion, if one or several light beams are interrupted by the storage goods 25.

The shown control station permits the determination of a horizontal protrusion U1 as well as of a vertical protrusion U2 already in the loading position of the storage goods carrier 7, so that the storage goods carrier 7 does not leave the control station 10 in case of a protrusion U1 or U2 due to a corresponding signal to the control unit. A light barrier 28 is arranged in the proximity of the bottom of the control station 10 for the determination of the position of the storage goods carrier 7, where the light beam of said light barrier is interrupted by the storage goods carrier 7 located in the control station 10.

The invention claimed is:

1. A storage device (1) for storing storage goods (25) in storage spaces (8), the storage device (1) comprising:
   a control station (10) configured to receive at least one storage good carrier (7) with a stowage space volume (S), wherein each storage goods carrier (7) is configured to receive storage goods (25) within the stowage space volume (S), wherein the control station (10) provides a loading position for an operator to introduce the at least one storage good carrier (7) into the storage device (1), and wherein the stowage space volume (S) of the at least one storage goods carrier (7) is accessible by an operator from outside of the storage device (1) via a control opening of the control station (10) when the at least one storage goods carrier (7) is in the loading position;
   a conveyor unit (5, 6) configured to move the at least one storage goods carrier (7) within the storage device (1) from the loading position in the control station (10) to the storage spaces (8);
   a control unit (29) for automatically controlling the conveyor unit (5, 6);
   and at least one protrusion measuring unit (11a, 11b, 11c, 11d, 11e, 11f) configured to determine a horizontal protrusion (U1) of the storage goods (25) beyond the stowage space volume (S);
   characterized in that:
   the at least one protrusion measuring unit (11a, 11b, 1c, 11d, 11e, 11f) is arranged at least partially within the control station (10) and comprises at least one light grille (11a, 11b, 11c, 11d, 11e, 11f); and
   at least one triggering element (23, 28) associated with the at least one storage goods carrier (7) configured to signal the control unit (29) to commence protrusion measurement when the at least one storage goods carrier (7) is in a predetermined position at least partially within the control station (10), such that storage good protrusions are detected prior to the at least one storage goods carrier (7) being moved within the storage device (1) by the conveyor unit (5,6).

2. The storage device (1) according to claim 1, characterized in that the at least one protrusion measuring unit (11a, 11b, 11c, 11d, 11e, 11f) further comprises:
   a height measuring unit for measuring the height of the stowage space volume (S) occupied by the storage goods (25).

3. The storage device (1) according to claim 1, characterized in that the at least one protrusion measuring unit (11*a*, 11*b*, 11*c*, 11*d*, 11*e*, 11*f*) is disposed at an end of the control station (10) adjacent the conveyor unit (5, 6).

4. The storage device (1) according to claim 1, characterized in that the at least one protrusion measuring unit (11*a*, 11*b*, 11*c*, 11*d*, 11*e*, 11*f*) is arranged proximate the loading position provided by the control station (10).

5. The storage device (1) according to claim 1, characterized in that the at least one triggering element (23, 28) is disposed on an outer edge of its respective storage goods carrier (7).

6. The storage device (1) according to claim 1, characterized in that the at least one triggering element (23, 28) comprises at least one screen (18) configured to cover a light beam produced by the at least one light grille.

7. The storage device (1) according to claim 6, characterized in that the at least one storage goods carrier (7) comprises at least two screens (18) arranged in a longitudinal direction (H, V) of the storage goods carrier (7) next to one another.

8. A method for arranging storage goods (25) in a storage device (1), comprising:
receiving at least one storage goods carrier (7) at a control opening of a control station (10) of the storage device (1), each storage goods carrier (7) having a stowage space volume (S) that is arrangeable by an operator from outside the storage device (1) via the control opening when each storage goods carrier (7) is disposed in a loading position provided by the control station (10) of the storage device (1);
automatically depositing each storage goods carrier (7) in one of a plurality of storage spaces (8) of the storage device (1) by moving the storage goods carrier (7) within the storage device via a conveyor unit (5,6), the plurality of storage spaces (8) being arranged adjacent or atop of each other; and
detecting, prior to the storage goods (25) being deposited, whether the storage goods (25) project beyond the stowage space volume (S), characterized in that a triggering element (23, 28) included on storage goods carrier (7) causes a signal to be emitted to a control unit (29) of the storage device (1) when one of the at least one storage goods carriers (7) is moved into or out of the loading position, and the signal causes the detecting to commence.

9. The method according to claim 8, characterized in that the detecting utilizes a protrusion measuring unit (11*a*, 11*b*, 11*c*, 11*d*, 11*e*, 11*f*) to detect when the storage goods project beyond the stowage space volume and the method according to claim 8 further comprises:
emitting, from the protrusion measuring unit (11*a*, 11*b*, 11*e*, 11*d*, 11*e*, 11*f*), a signal to the control unit (29) when the storage goods (25) project beyond the stowage space volume (S) associated with the storage goods carrier (7).

10. The method according to claim 9, characterized in that the control unit (29) emits, as a result of receiving the signal from the protrusion measuring unit (11*a*, 11*b*, 11*c*, 11*d*, 11*e*, 11*f*), a motor control signal to the conveyor unit (5, 6) causing the conveyor unit (5, 6) to stop.

11. The method according to claim 9, characterized in that a light beam (23, 24) is broken by a screen (18, 20) included on the storage goods carrier (7), causing the signal to commence detecting to be emitted.

12. The method according to claim 8, wherein the control station (10) includes a light grille and the signal that causes detecting to commence is emitted to the control unit (29) when the storage goods carrier (7) enters or exits the light grille.

* * * * *